United States Patent
Hu

(10) Patent No.: US 7,196,822 B2
(45) Date of Patent: Mar. 27, 2007

(54) SECURITY DOCUMENT MANUFACTURING METHOD AND APPARATUS USING HALFTONE DOTS THAT CONTAIN MICROSCOPIC IMAGES

(75) Inventor: Huver Hu, Kansas City, MO (US)

(73) Assignee: Amgraf, Inc., Kansas City, MO (US)

( * ) Notice: Subject to any disclaimer, the term of this patent is extended or adjusted under 35 U.S.C. 154(b) by 1089 days.

(21) Appl. No.: 10/047,146

(22) Filed: Jan. 14, 2002

(65) Prior Publication Data

US 2003/0038974 A1  Feb. 27, 2003

Related U.S. Application Data

(60) Provisional application No. 60/312,170, filed on Aug. 14, 2001.

(51) Int. Cl.
*H04N 1/405* (2006.01)

(52) U.S. Cl. ..................... 358/3.16; 358/3.06

(58) Field of Classification Search ............... 358/1.9, 358/2.1, 3.16–3.18, 3.06, 3.2, 3.11–3.12, 358/3.28; 382/237

See application file for complete search history.

(56) References Cited

U.S. PATENT DOCUMENTS

| | | |
|---|---|---|
| 4,227,720 A | 10/1980 | Mowry, Jr. et al. |
| 4,600,666 A | 7/1986 | Zink |
| 5,340,159 A | 8/1994 | Mowry, Jr. |
| 5,422,742 A | 6/1995 | Ostromoukhov et al. |
| 5,438,431 A | 8/1995 | Ostromoukhov |
| 5,636,874 A | 6/1997 | Singer |
| 5,701,366 A | 12/1997 | Ostromoukhov et al. |
| 5,704,651 A | 1/1998 | Phillips |
| 5,710,636 A | 1/1998 | Curry |
| 5,737,453 A | 4/1998 | Ostromoukhov |
| 5,762,378 A | 6/1998 | Phillips |
| 5,772,248 A | 6/1998 | Phillips |
| 5,788,285 A | 8/1998 | Wicker |

(Continued)

OTHER PUBLICATIONS

*Graphics Master 2*: [a workbook of planning aids, reference guides, and graphic tools for the design, estimating, preparation, and production of printing and print and print advertising], Dean Phillip Lem, ISBN 0-914218-02-6; 1977; p. 7.

(Continued)

*Primary Examiner*—Thomas D. Lee
*Assistant Examiner*—Stephen Brinich
(74) *Attorney, Agent, or Firm*—Hovey Williams LLP

(57) ABSTRACT

A method to capture any user-selected image such as a corporate logo, a photograph, or a key word or phrase, and to convert that image into a microscopic halftone dot with tonal variation features, and to allow substitution of theses dots for conventional square, round, elliptical, diamond and/or other shaped dots typically used in normal commercial printing. Through this invention, all or selected graphical elements of a printed image can be rendered in "logodots" that can be verified with a magnifying device and that are difficult to copy using commercial photocopiers and scanners and result in pronounced streaking patterns in copies so made. Through this invention an economical, graphical manufacturing technique is provided for printing security documents such as checks, certificates, transcripts, and other objects having monetary or intrinsic value.

19 Claims, 17 Drawing Sheets

U.S. PATENT DOCUMENTS

| | | |
|---|---|---|
| 5,853,197 A | 12/1998 | Mowry, Jr. et al. |
| 5,873,604 A | 2/1999 | Phillips |
| 5,923,774 A | 7/1999 | Ostromoukhov |
| 6,082,775 A | 7/2000 | Phillips |
| 6,106,021 A | 8/2000 | Phillips |
| 6,172,770 B1 * | 1/2001 | Inoue .................... 358/3.06 |
| 6,198,545 B1 | 3/2001 | Ostromoukhov et al. |
| 6,356,362 B1 | 3/2002 | Ostromoukhov |
| 6,661,535 B1 * | 12/2003 | Fujimura et al. .......... 358/3.02 |
| 6,692,030 B1 | 2/2004 | Phillips |
| 6,870,642 B2 | 3/2005 | Ostromoukhov |
| 7,027,660 B2 | 4/2006 | Hersch et al. |
| 7,054,038 B1 | 5/2006 | Ostromoukhov et al. |

OTHER PUBLICATIONS

"Artistic Screening", Ostromoukhov, Victor, and Roger D. Hersch; *ACM Computer Graphics, Annual Conference Series*; 1995, pp. 219-228.

\* cited by examiner

Original Microtext Document

Photocopied Microtext Document

Custom Phrase SafeTDot Dot
0% --> 100% Density, 10 lines per inch, 45° Dot Draw Angle
 — 36

Custom Shape Dot
0% --> 100% Density, 10 lines per inch, 45° Dot Draw Angle

Custom Photograph Dot
0% --> 100% Density, 10 lines per inch, 45° Dot Draw Angle
 — 34

Custom SafeTDot Dot
0% --> 100% Density, 10 lines per inch, 45° Dot Draw Angle
 — 38

Custom Route 76 Dot
0% --> 100% Density, 10 lines per inch, 45° Dot Draw Angle
 — 32

Pixel Illumination Ranking Order

| 254 | 208 | 189 | 205 | 210 | 214 | 221 | 225 | 229 | 232 | 238 | 243 | 248 | 251 | 254 |
|---|---|---|---|---|---|---|---|---|---|---|---|---|---|---|
| 229 | 186 | 189 | 206 | 211 | 216 | 221 | 226 | 229 | 233 | 238 | 244 | 249 | 252 | 254 |
| 213 | 183 | 191 | 209 | 214 | 217 | 223 | 228 | 230 | 234 | 239 | 245 | 251 | 253 | 254 |
| 211 | 181 | 197 | 211 | 216 | 220 | 225 | 230 | 233 | 236 | 241 | 247 | 252 | 253 | 254 |
| 188 | 210 | 209 | 213 | 219 | 222 | 226 | 232 | 238 | 240 | 242 | 248 | 252 | 254 | 254 |
| 192 | 213 | 213 | 214 | 221 | 225 | 228 | 235 | 244 | 249 | 247 | 244 | 241 | 238 | 234 |
| 197 | 214 | 216 | 217 | 223 | 226 | 226 | 223 | 218 | 211 | 208 | 203 | 199 | 193 | 187 |
| 205 | 219 | 223 | 226 | 228 | 242 | 234 | 202 | 176 | 125 | 101 | 79 | 53 | 31 | 12 |
| 209 | 222 | 226 | 228 | 241 | 250 | 229 | 163 | 102 | 69 | 32 | 0 | 0 | 0 | 0 |
| 211 | 223 | 229 | 232 | 241 | 251 | 227 | 160 | 99 | 63 | 28 | 0 | 0 | 0 | 0 |
| 216 | 226 | 231 | 235 | 243 | 253 | 223 | 152 | 77 | 32 | 0 | 0 | 0 | 0 | 0 |
| 220 | 231 | 233 | 240 | 246 | 251 | 219 | 147 | 61 | 27 | 0 | 0 | 0 | 0 | 0 |
| 227 | 235 | 237 | 243 | 250 | 248 | 211 | 119 | 39 | 0 | 0 | 0 | 0 | 0 | 0 |
| 231 | 240 | 242 | 249 | 254 | 250 | 207 | 101 | 14 | 0 | 0 | 0 | 0 | 0 | 0 |
| 238 | 242 | 246 | 250 | 254 | 249 | 201 | 97 | 10 | 0 | 0 | 0 | 0 | 0 | 0 |

— 70

Photographs
96

Raster Images, Logos, and Symbols
98

Typefaces and Textual Objects
100

Rules and Lines
102

Arcs and Splines
106

Circles and Ellipses
104

Filled Areas
108

Borders, Pantographs, and Patterns
110

Security Document with All Graphical Elements Rendered in Conventional Halftone Dots Security Document with Selected Graphical Elements Rendered in Custom Halftone Dots ("logodots").

SECURITY DOCUMENT MANUFACTURING METHOD AND APPARATUS USING HALFTONE DOTS THAT CONTAIN MICROSCOPIC IMAGES

RELATED APPLICATION

The present application relates to and claims priority with regard to all common subject matter of the provisional patent application titled "SECURITY DOCUMENT MANUFACTURING METHOD USING HALFTONE DOTS THAT CONTAIN MICROSCOPIC IMAGES," Ser. No. 60/312,170, filed Aug. 14, 2001. The identified provisional patent application is hereby incorporated into the present application by reference.

COMPUTER PROGRAM LISTING APPENDIX

A computer program listing appendix containing the source code of a computer program that may be used with the present invention is incorporated herein by reference and appended hereto as one (1) original compact disk, and an identical copy thereof, containing a total of two (2) files as follows:

Directory of Dotmaker D:\

| Filename | Size/Type | Modified |
| --- | --- | --- |
| dmbin.c | 23 KB/C file | 12/20/2001 7:04 a.m. |
| dotmaker | 20 KB/File | 12/20/2001 7:04 a.m. |

FIELD OF THE INVENTION

The present invention relates generally to a new method and apparatus for creating security documents. More particularly, the invention relates to a printing technique using microscopic images made of user-definable custom halftone dots for providing an economical, graphical method to create and manufacture security documents such as checks, certificates, transcripts, and other objects having monetary or intrinsic value as well as providing the ability to customize general printing materials.

DESCRIPTION OF THE PRIOR ART

Halftone screening dots have been in use for years to enable the printing of continuous tone images. To print various tones of color on paper with printing presses and ink or toner, the area of color must be converted to halftone dots (or lines) of an appropriate radius or thickness, with the (normally white) base paper (or other substrate) color showing through. Tonal variation is achieved by changing the density of the halftone dots. The more density is increased, the darker a region becomes. Close examination of almost any commercially printed document will reveal these halftone dots. The inventors of halftone screening have strived to develop methods to generate halftone dots that are free from artifacts, and that render printed images which are as faithful as possible to the original continuous tone (unscreened) models, and do so under the most extreme printing environments on the widest range of substrates. Typically, conventional halftone dots are shaped as solid squares, filled circles or ellipses, filled diamond shapes, and/or solid lines, and they are used to print everything from newspapers and magazines to elaborate security documents such as checks and certificates. Typical halftone dot shapes are shown in FIG. 1, including round dots 10, square dots 12, ellipse dots 14, diamond dots 16, horizontal line 18, and 45° line 20. These dots are all printed in a 0% to 100% density range.

Within established practices of printing halftone images on bi-level digital imaging devices, two common techniques exist: halftone dot, and dither matrix (or dither array). The invention described herein is based on the use of the halftone dot, where a spot cell of some number of pixels is used. For printing densities between 0% (all pixels white) and 100% (all pixels black), the pixels in the cell are to "turn on" (set as black), such that more and more "black pixels" appear as the density value progresses toward 100%. Examples of this technique are shown in U.S. Pat. No. 5,166,809. One such established practice is exemplified by PostScript, a page description language developed by Adobe Systems Incorporated located in San Jose, Calif. PostScript Language is described in *PostScript Language Reference Manual,* 2nd Ed., Adobe Systems Inc., Addison-Wesley, Reading, Mass., 1990, *PostScript Language Supplement,* Language Level 3 Specification and Adobe PostScript 3 Version 3010 Product Supplement, Adobe Systems Inc., San Jose, Calif., 1997, and *PostScript Screening: Adobe Accurate Screens,* Peter Fink, Adobe Press, Mountain View, Calif., 1992. PostScript is commonly utilized in the graphic arts industry for creating printable images, master films, negatives, and the printing plates used with conventional and digital printing presses. By default, PostScript image setters use the Euclidean composite dot, as detailed in PostScript Screening: Adobe Accurate Screens, to image halftone screens.

In the past, there have been several patented techniques describing methods to utilize conventional halftone dots to manufacture and print documents that are graphically resistant to counterfeiting with photocopiers, digital scanners, and desktop publishing equipment. These techniques are based on the fact that the human eye is less sensitive than optical machines to small variations in the color density of printed areas on a paper (or other similar substrate) document. The human eye does not detect these slight variations whereas the optical scanner or photocopier does. The variations tend to become much more pronounced in the copy or reproduction, and ruin the evenness of the image. By designing a security document with a camouflage background image that consists of certain areas having one variation in tone, and other foreground areas (often a cancellation phrase or warning word such as "VOID") having a slightly different tone, the copy or reproduction becomes obvious.

The graphical halftone screen anti-counterfeiting techniques used in the past have consisted of tone variations including "big dots and little dots" as shown in U.S. Pat. No. 4,227,720, "dotted lines and solid lines" as shown in U.S. Pat. No. 5,788,285, juxtapositions of dot screens and line screens at varying angles as shown in U.S. Pat. No. 5,853,197, and graduated tone dot screens (from light to dark) in both background and foreground as shown in U.S. Pat. No. 5,340,159.

The problem with using only conventional halftone dots for security documents today is that scanning and photocopying equipment have improved, especially in the case of color copiers, and subtle tone variations are no longer as effective. New color copiers compensate for these subtle variations with remarkable results, producing near-perfect copies that cannot easily be identified as copies.

Another effective technique to add graphical security to a printed document is known as "microtext", whereby words or phrases are printed in very small letterforms that can barely be perceived with the naked eye. These tiny letters are too small to be accurately copied by most of the available scanners and photocopiers. The resulting copy yields a "blot" instead of a legible letterform, and a string of letters or words often copy as a fuzzy line. FIG. 2 illustrates the effectiveness of microtext as a method to detect a copy. FIG. 2 shows a specimen of a security document 22 that includes microtext letterforms 24 that are printed at a size of one-half point or smaller. In general, a magnifying glass is required to read microtext as shown in callout region 26. When photocopied, the microtext cannot be resolved and the resultant "blotting" renders the text illegible. Security specimen 22 is photocopied 28 and when examined under a magnifying glass as shown in callout region 30 the microtext has not been faithfully copied.

Although microtext is a valuable technique for document validation, there are some problems to consider. The person doing the document validation must know where on the document to look for microtext, and a magnifying glass or printer's loupe of 8× or higher power must be available to examine the document. In addition, when creating the document containing microtext, each letterform in a microtext string is treated as an individual graphical element that must be processed by a Raster Image Processor (RIP) or other character forming technique, then that subset of the composite image reduced to halftone dots. The processing overhead to compose and output large quantities of microtext can be a significant and time-consuming.

Inserting a human readable pattern within a halftone cell is the invention described by Curry in U.S. Pat. No. 5,710,636, however, the method, application, flexibility, extensibility, and end result differ substantially from the invention described herein. Curry describes a specially stylized set of halftone cells consisting of segments of letterforms, that when positioned and rotated like "building blocks", create hidden messages within a toned area.

The invention described herein also differs substantially from other published digital image half-toning techniques that apply only to raster bitmaps. One such invention is described in U.S. Pat. No. 6,198,545 entitled "Anti-Counterfeiting Features of Artistic Screening," wherein a halftone image is analyzed, and density variations then replaced by pre-designed screen elements, or replaced by new in-between element shapes computed by interpolating between the two nearest known replacement shapes. With "Artistic Screening," the composite image is screened in one pass, and the entire image as a whole is treated as a single grayscale raster bitmap. The screening process applies universally to the entire composite, or to selected masked areas that are also grayscale raster bitmaps. Similar digital image filtering effects are found in many desktop publishing photographic editing programs such as Adobe System's Photoshop software. In addition to these digital techniques, mechanical film-based optical filters and contact screens as described in U.S. Pat. No. 4,600,666 have been utilized for many years to achieve the same end result, again applying one half-toning effect to an entire composite image.

There are many non-graphical techniques to incorporate security into a printed document, however, these usually contribute substantial added expense to the manufacturing process. Some of the most common protective techniques are to use special inks (e.g. fluorescent), special papers (e.g. embedded filaments), chemical additives (e.g. magnetic or thermochromic reactive coatings), affixed devices (e.g. holograms), pre-treatments such as watermarks, and post treatments such as embossing. While there are compelling reasons to utilize many of these techniques, the addition of security features via purely graphical techniques can be done much more economically, without a major change in the traditional print manufacturing processes. Although non-graphical techniques and devices may be suitable for the particular purpose to which they are addressed, they are not as suitable for providing an economical, graphical method to create and manufacture security documents.

Consequently, there is a need for a new method to add security features via purely graphical techniques that can be economically implemented without any major change in the traditional print manufacturing processes.

SUMMARY AND OBJECTS OF THE INVENTION

The present invention generally comprises a method to capture any user-selected image such as a corporate logo, a photograph, or a key word or phrase, to convert that image into a microscopic halftone dot with tonal variation features ("logodots"), and to allow the use of these logodots as a substitute for the conventional square, round, elliptical, diamond and/or other shaped dots typically used in normal commercial printing. Through this invention, all or selected areas of a printed image can be rendered in logodots that can be verified with a magnifying device.

The inventions broadly include: (a) a method to digitally capture any user-selected image such as a corporate logo, a photograph, or a key word or phrase, and to convert that image into a microscopic logodot, and in doing so specify the white-to-black transition characteristics (illumination ranking) of the logodot so that it can be utilized by conventional printing devices to represent graphical images with halftone densities ranging smoothly from zero to 100%; (b) a method to automatically generate printing device-specific instructions to output the logodot as a suitable substitute for conventional halftone dots; (c) a method to save various collections of custom dot designs as libraries; (d) a method to refer to custom dots by name and assign the logodot to any graphical element within a composite image or graphical design; and (e) a method to utilize logodots for the protection of security documents (or other printed objects) by causing a replication to be visually obvious and/or self-canceling.

Thus, a primary object of the invention is to provide a method whereby user-selected image(s) can be converted to a logodot that contains a microscopic embedded image.

Another object is to provide a method to automatically generate printing device-specific instructions to output the logodot as a suitable substitute for conventional halftone dots.

Another object of the present invention is to provide a security document manufacturing method using microscopic images that will overcome some or all of the shortcomings of the prior art devices.

Another object of the present invention is to provide a new security document manufacturing method using microscopic images for providing an economical, graphical method to create and print security documents such as checks, certificates, transcripts, and other documents having monetary or intrinsic value.

Another object is to provide a security document manufacturing method using microscopic images that will allow these microscopic halftone dots to be used in combination with conventional halftone dots for rendering any graphical object, e.g., photographs, raster images, logos, symbols, text and typefaces, rules and lines, circles, arcs, splines, colored areas, borders, pantographs, patterns, and any other graphical element found or used in a commercially designed security document.

Another object is to provide a security document manufacturing method using microscopic images that will automatically adjust the tonal density from white-to-black and all variations of gray level between black and white dynamically according to the attributes of the graphical element or the wishes of the graphical designer.

Another object is to provide a security document manufacturing method using microscopic images that will provide a simple procedure to create and employ the logodot, and an efficient method to output graphical images that contain the logodot.

Another object is to provide a simple method to develop libraries of custom dot designs.

Another object is to provide a simple method to name each custom dot design and refer to the custom dot by name when linking it to a graphical element within a composite image.

Other objects and advantages of the present invention will become obvious to the reader and it is intended that these objects and advantages arc to be within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

The general purpose of the present invention is to provide a new security document manufacturing method using custom halftone dots ("logodots") that contain microscopic images that are inserted during the document's or printed object's creation and/or composition. For the purposes of this specification, an image is considered microscopic if a casual observer cannot readily see the image without the aid of a magnifying device. In view of the foregoing disadvantages inherent in the known types and uses of conventional halftone dots now present in the prior art, the present invention describes a new manufacturing method that can be used as an economical, graphical alternative to create and print security documents such as checks, certificates, transcripts, and other documents having monetary or intrinsic value. These dots printed at higher magnifications may also be desirable for creating custom printed images in other types of printed materials.

Turning now to the drawings, the attached figures illustrate a security document manufacturing method using halftone dots that contain microscopic images. In the preferred embodiment, a computer software program has been developed to run on a computer workstation, the MECCA 2000 Integrated Electronic Publishing System manufactured by Amgraf, Inc., located in Kansas City, Mo. It will be appreciated that other computer hardware and different embodiments of the computer software can be employed to perform the methods disclosed herein.

The widely used offset printing process, and many other conventional and digital printing techniques, depend on the phenomenon of halftone dot screening to render lighter shades of colors with a single ink. With a single color of ink, tones are achieved by screening the desired area into regularly spaced dots of smaller size for lighter tones, and larger size dots for darker tones. Solid colored areas do not need or use halftone dots.

Figure 1:
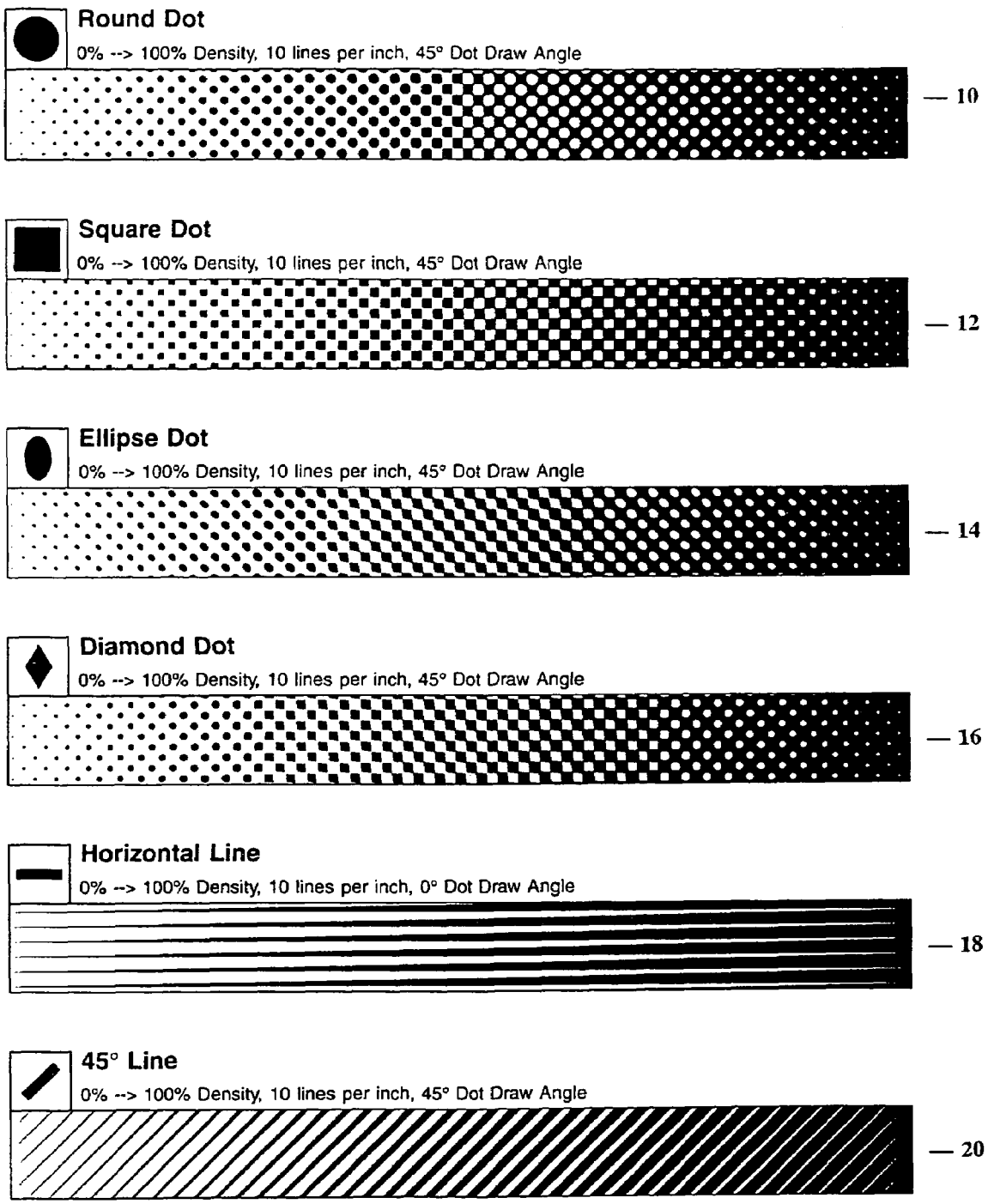
FIG. 1 shows examples of conventional halftone dot and line screens.
Figure 2:
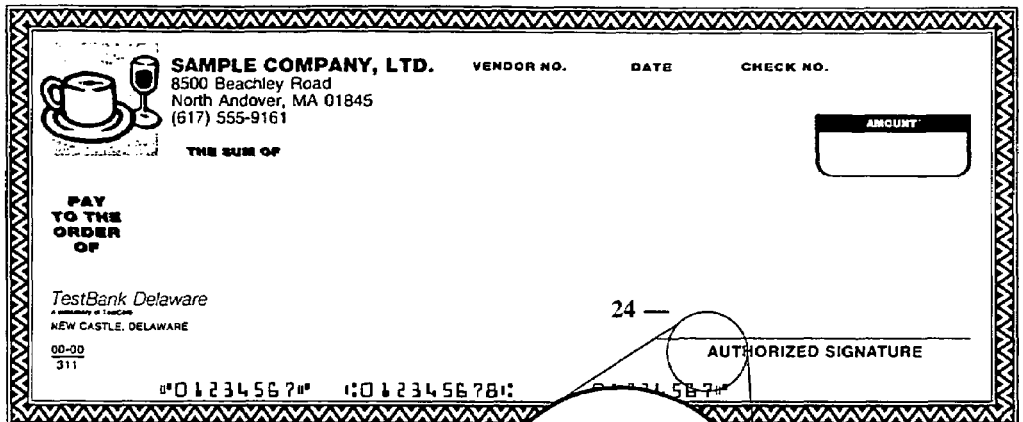
FIG. 2 shows enlarged examples of microtext before and after a photocopy.
Figure 2:
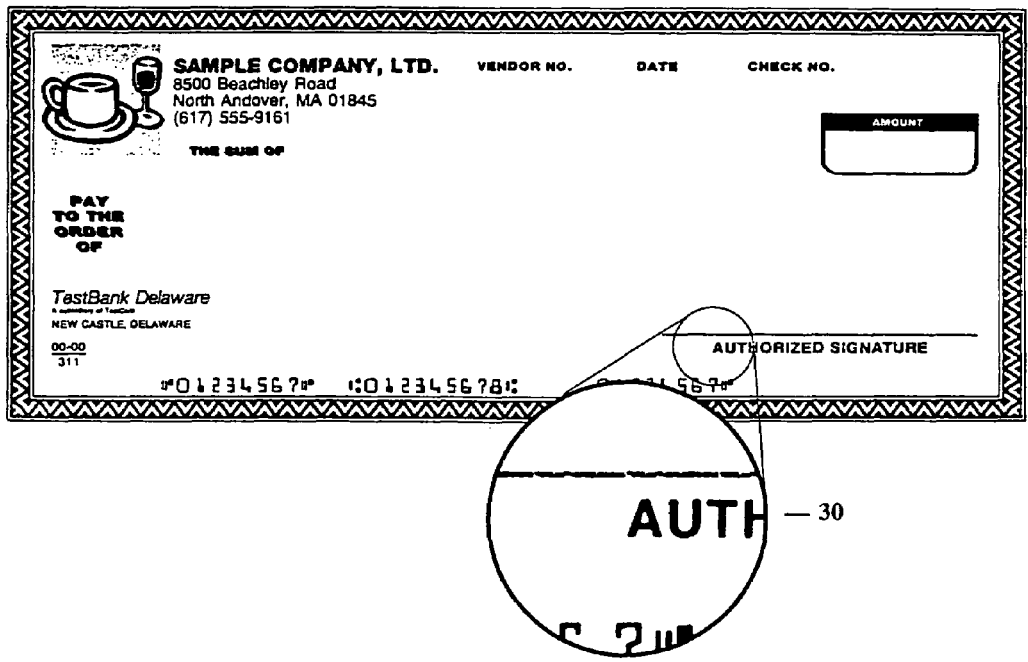

Through the halftone screening process, a broad range of tones from almost white to almost solid color are possible, all from a single ink color. It has been previously established in the prior art that the most consistently perfect printed results on the widest range of substrates are obtained with so-called "conventional dot screens," generally round, square, elliptical, or diamond shaped dots, as well as line screens composed of parallel line shapes. FIG. 1 shows the most common halftone dot shapes in general use today. Please note that in the drawings, the halftone dots are printed at a large size for illustrative purposes.

In the present invention, a method is described whereby the "conventional dot screens" can be selectively replaced on an item-by-item basis with "custom dot screens" comprised of custom dots that are uniquely designed and shaped. While this may not be desirable for all printing applications, the ability to selectively include custom screened graphical elements into a composed image has the benefit of making the printed document or object difficult to copy, and therefore resistant to counterfeiting.

Halftone dots are successful in visually representing tones and images on a printed object because the human eye merges the dots into a perceived continuous tone. This occurs because the dots are typically very small, and only obvious if the printed document or object is enlarged or magnified. This invention reveals a method to insert a microscopic image into desired halftone dots, thereby creating logodots, allowing the user to continue the prepress design and composition functions as before. The printed document or object appears to the naked human eye the same as a conventionally produced product. However, when the printed document or object is photocopied or scanned, the logodots that contain the microscopic images are either reproduced lighter or darker than conventional halftone dots of the same relative density or darkness. The reproducibility variation between the two dot technologies can be purposely taken advantage of to create graphic designs that are self-canceling when photocopied or scanned.

Figure 3:
FIG. 3 shows examples of Custom halftone dot screens.
Figure 3:
Figure 3:
Figure 3:
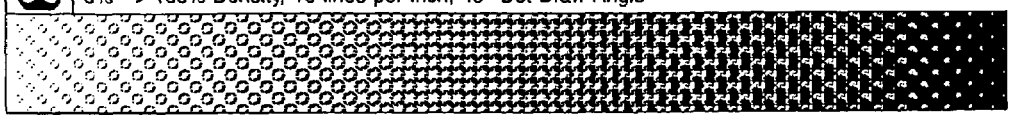
Figure 3:
Figure 3:
Figure 3:
Figure 3:
Figure 3:
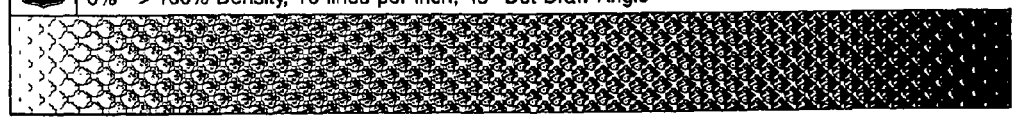

In one embodiment of the invention, a software program is used to create logodots for PostScript imaging devices. FIG. 3 shows samples of logodots created using the software program described herein. FIG. 3 also illustrates that the invention includes a method to capture any user-selected image such as a corporate logo 32, a photograph 34, or a key word or phrase 36 or a stylized key word or phrase 38, and to convert that image into a microscopic halftone dot with tonal variation features. These logodots may be used as a substitute for conventional square, round, elliptical, diamond and/or other shaped dots typically used in normal commercial printing.

Figure 4:
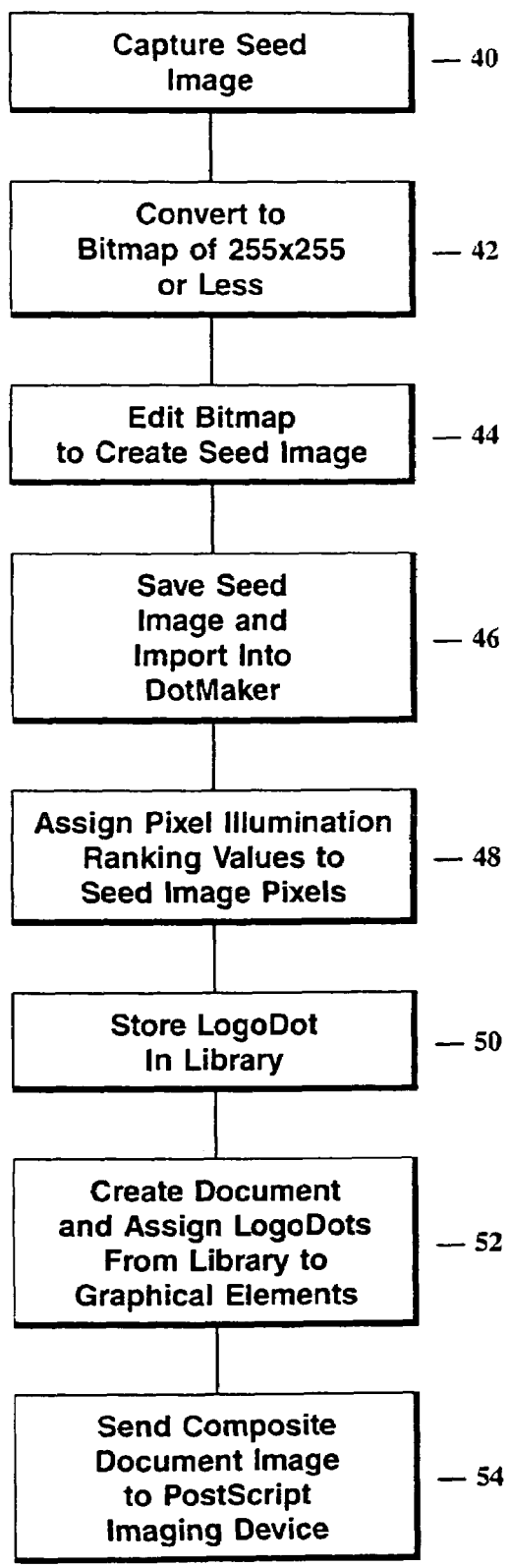
FIG. 4 is a flow diagram of one embodiment of the method of the present invention.
Figure 5:
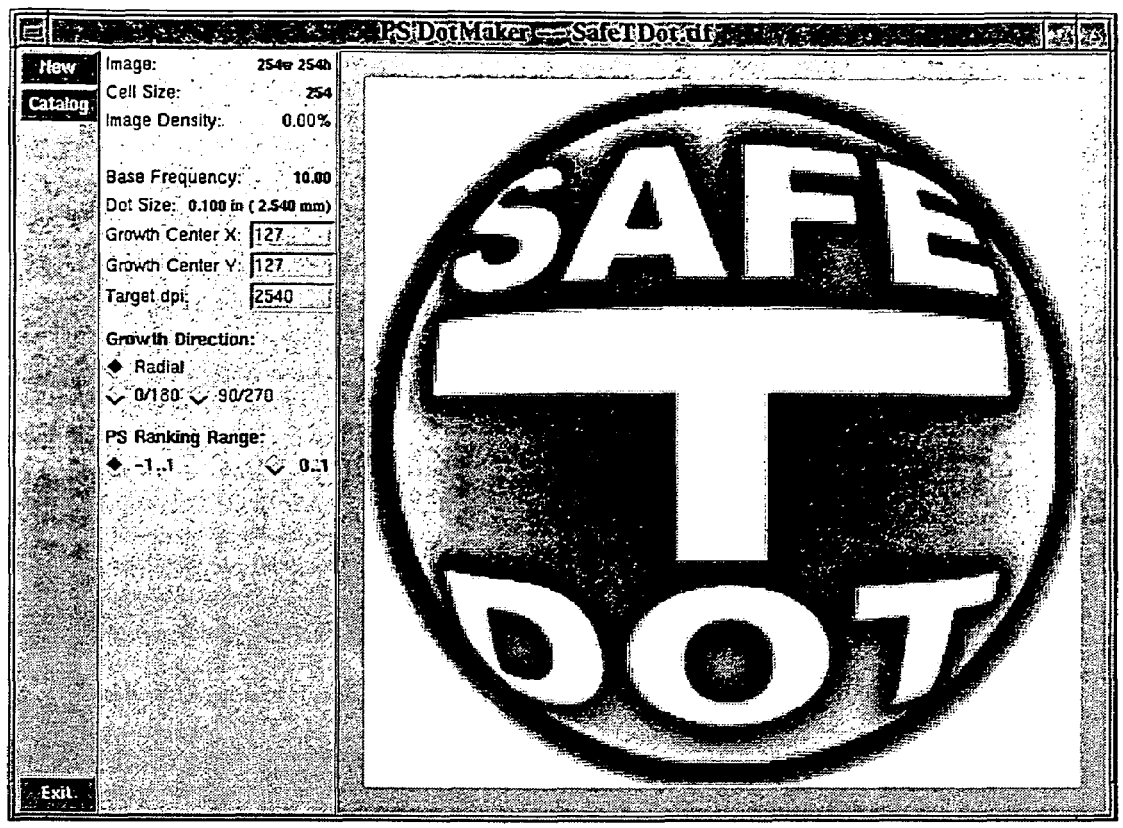
FIG. 5 shows a program user interface from one embodiment of the invention.

In general, the procedure to follow in order to create a security document that contains the invention's custom dots is shown in FIG. 4, a flow diagram of the method. At step 40 the designer captures a "seed" image in a digital format to use as the logodot. The image can be captured by scanning from a hard-copy of the image or obtained via a digital camera or other means. Obviously, the image may also be created directly in a computer using a number of known means and commercially available software. At step 42, the image is reduced to a rectangular "bit-map" with an overall pixel count not to exceed 255×255 pixels. The 255×255 limit is a constraint currently imposed by the hardware, but it is anticipated that this limit will change in the future without departing from the scope of the invention. At Step 44, using standard desktop publishing pixel editing software, the bit-map may optionally be edited so that the image is visually more pleasing. If the "seed" image consists of pure black on pure white, it is particularly useful to add graduated shades of gray to simulate a halo or shadow around and within the image, thereby making the image appear to have depth. The "seed" image will be converted into illumination ranking values based on the order of tonal variation across the dark to light spectrum so that black pixels are illuminated first, followed by the darkest gray pixels progressively to the lightest gray pixels, and the white pixels are illuminated last. The user interface to the program is shown as FIG. 5. The resultant "seed" image is saved at step 46 from the pixel editor program then loaded into the "DotMaker" program, named, and processed into a logodot consisting of illumination ranking values at step 48. This step will be described in further detail below. These ranking values of the spot cell are then stored in step 50 in a customer dot library on the computer. At step 52, a user creates or opens a design file for a security document and assigns various custom dot names (and screening attributes) to various graphical elements such as photographs, text and typefaces, rules and lines, circles, arcs, splines, colored areas, borders, pantographs, patterns, and logos. Finally, at step 54, the user selects the "Output" menu and sends the composite image to a PostScript imaging device to create printing plates, negatives, and/or films which comprise the security document containing one or more logodots in the positions and shapes as determined by the user.

Figure 6:
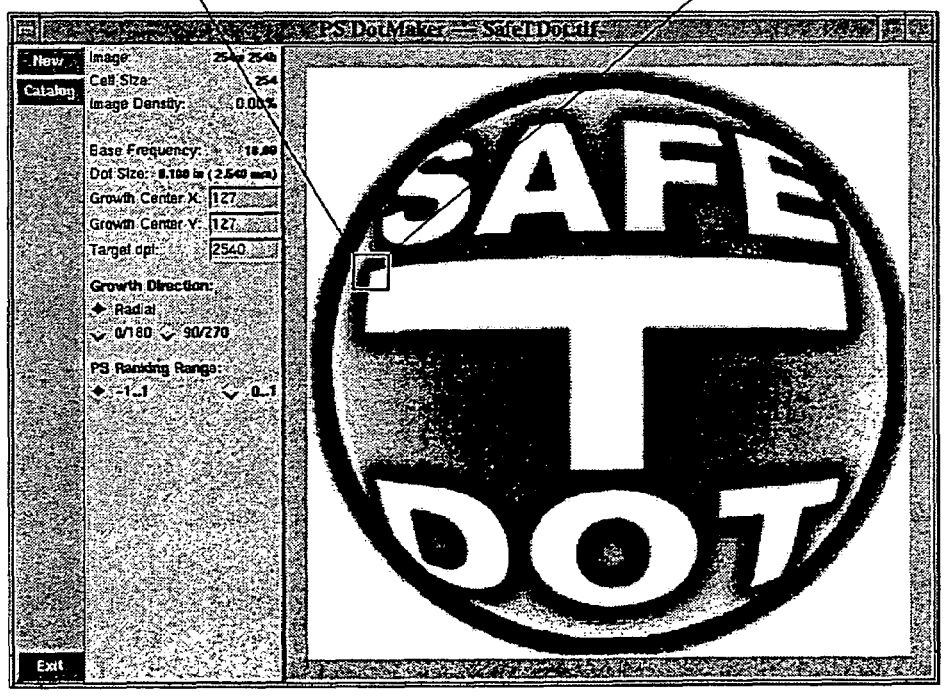
FIG. 6 shows the pixel illumination ranking order for a custom halftone dot.

The process employed by the software at step 48 of assigning the pixel ranking values for the created logodot will now be described in more detail. As will be appreciated by one of ordinary skill in the art, the PostScript language provides for a halftone spot function, a procedure written in the PostScript language that, when invoked by the PostScript RIP, is to provide the "ranking values" for all pixels in the cell. These ranking values determine how the pixels in the spot cell are to turn on: the higher the value, the sooner that pixel turns on as printing density is increased on a percentage basis. The invention described herein makes use of a visual "seed image" (captured and stored as described above) and an interpretive process (as opposed to a formula) to dynamically reprogram the spot function. After this reprogramming, the pixel ranking values are determined by the relative white to gray to black transitions of pixels and their relative locations within the reference "seed image," as shown in FIG. 6. The spot function is solely responsible for the pixel growth pattern within the cell.

In existing practice, to control pixel illumination, almost all of the prior art has dealt exclusively around the use of mathematical procedures to determine the pixel ranking values, such as the Euclidian algorithm to generate the "round dot" published by Adobe Systems, Inc. and set forth below:

```
{abs exch abs 2 copy add 1 gt
    {1 sub dup mul exch 1 sub dup mul add 1 sub}
    {dup mul exch dup mul add 1 exch sub}
ifelse}
```

Figure 7:
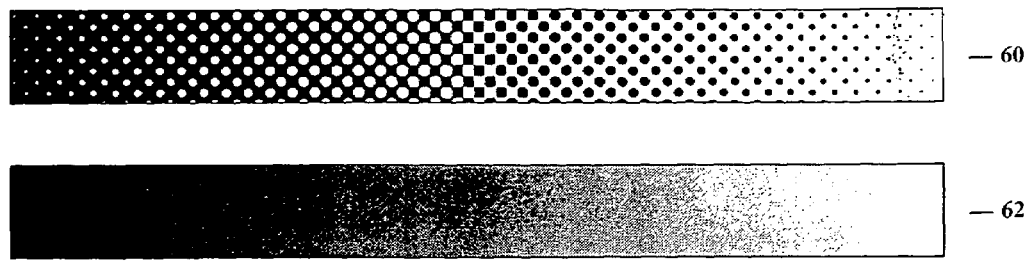
FIG. 7 shows the Euclidean composite dot.
Figure 8:
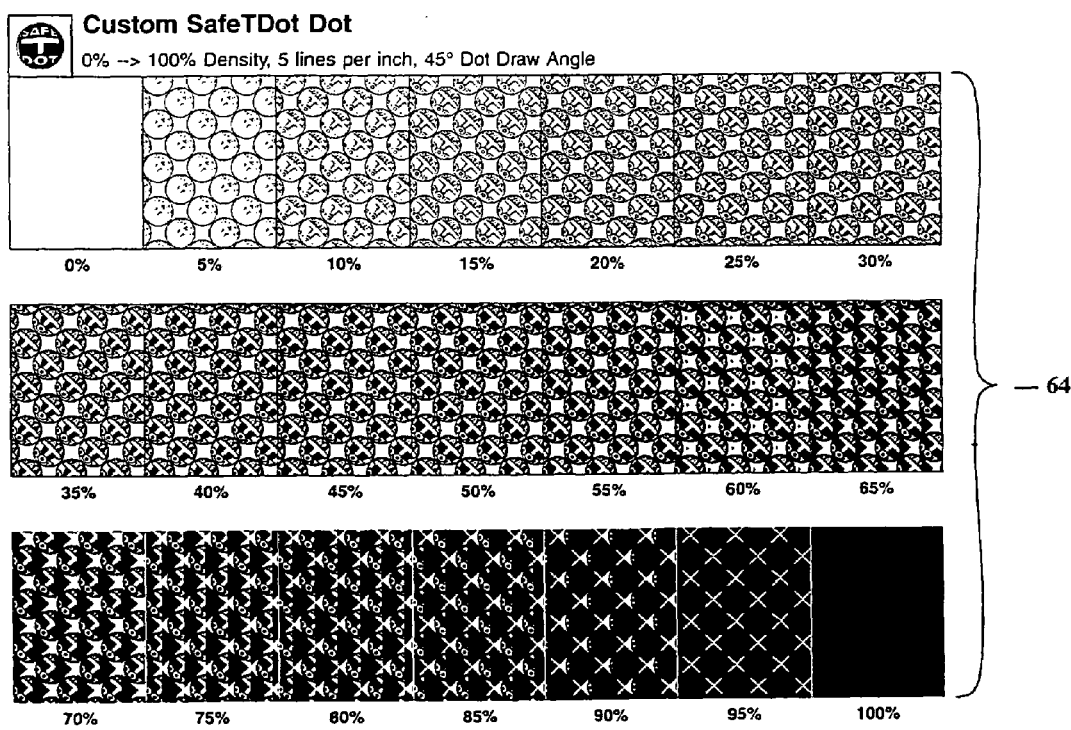
FIG. 8 shows custom halftone dot illumination through a range of 0% to 100%.

FIG. 7 shows the progression in density from 0% to 100% for the Euclidean composite dot function at ten lines per inch (LPI) 60 and eighty lines per inch (LPI) 62. An enlargement showing how a logodot progresses from 0% (white) to 100% (black) 64 by pixel ranking order illumination appears as FIG. 8. Although not all user-selected images can be used to construct a halftone dot that performs well throughout the full density range, there usually is a limited range where the custom dot is visually acceptable. The logodot example in FIG. 8 is legible from approximately 10% to 60% density, which makes it suitable for a number of background/foreground applications.

As shown in FIG. 6, the program takes a rectangular, digital bitmap as a "seed image," and converts it to a printing spot. First, the seed image is placed in a square cell with two sides 66, 68, whose side length (in terms of number of pixels) is the larger of the 2 sides of the image. For practical purposes, the current implementation limits the seed image to be no more than 255 pixels on either side. While increasing the number of pixels has the benefit of adding detail to the microscopic image, a lower line frequency must be specified in order for every pixel within the custom dot to be displayed. The following table shows the relationship between pixel matrix size and screen frequency for a custom dot imaged on an image setting device that has 2540 dots-per-inch (DPI):

TABLE 1

| logodot Pixel Matrix | Ideal Screen Frequency in lines-per inch (LPI) at 0-degree dot angle |
|---|---|
| 16 × 16 | 158.750 |
| 19 × 19 | 133.684 |
| 25 × 25 | 101.600 |
| 32 × 32 | 79.375 |
| 64 × 64 | 39.688 |
| 127 × 127 | 20.000 |
| 254 × 254 | 10.000 |

Any size pixel matrix can be used from 2×2 to 255×255. For screen frequencies other than the ideal, the custom halftone cell will be scaled to the specified lineage for output. If the image is imported in gray-scale, each pixel's darkness value is used as the "pixel ranking value" for the spot cell, where black corresponds to the highest ranking value, and white the lowest. These ranking values therefore reside inside the limit between zero and the highest value that each pixel size in the image can accommodate. An example of pixel ranking is shown in callout region 70, which represents the values given to one square region of the seed image in FIG. 6. For grayscale images stored with one byte per pixel, the limit is 255.

If the image is color, it is converted to gray-scale by using the commonly known Red Green Blue (RGB) color to Luminance calculation, e.g.:

$$Lula=0.30R+0.59G+0.11B$$

Once the color image is converted to gray-scale, it is treated as a gray-scale image.

If the image is bi-level, "black and white," the pixel ranking value is created by having the user first identify a "growth center" and the distance to this center from each black pixel in the image is computed. That distance is used to generate the pixel's ranking value: the smaller the distance, the higher the ranking value. All white pixels have their ranking value set to the lowest value (zero, in the sample implementation). Therefore, the spot will grow from nothing (0% density), to the original image, and on to all black (at 100% density), around the given center in the cell.

Figure 9:
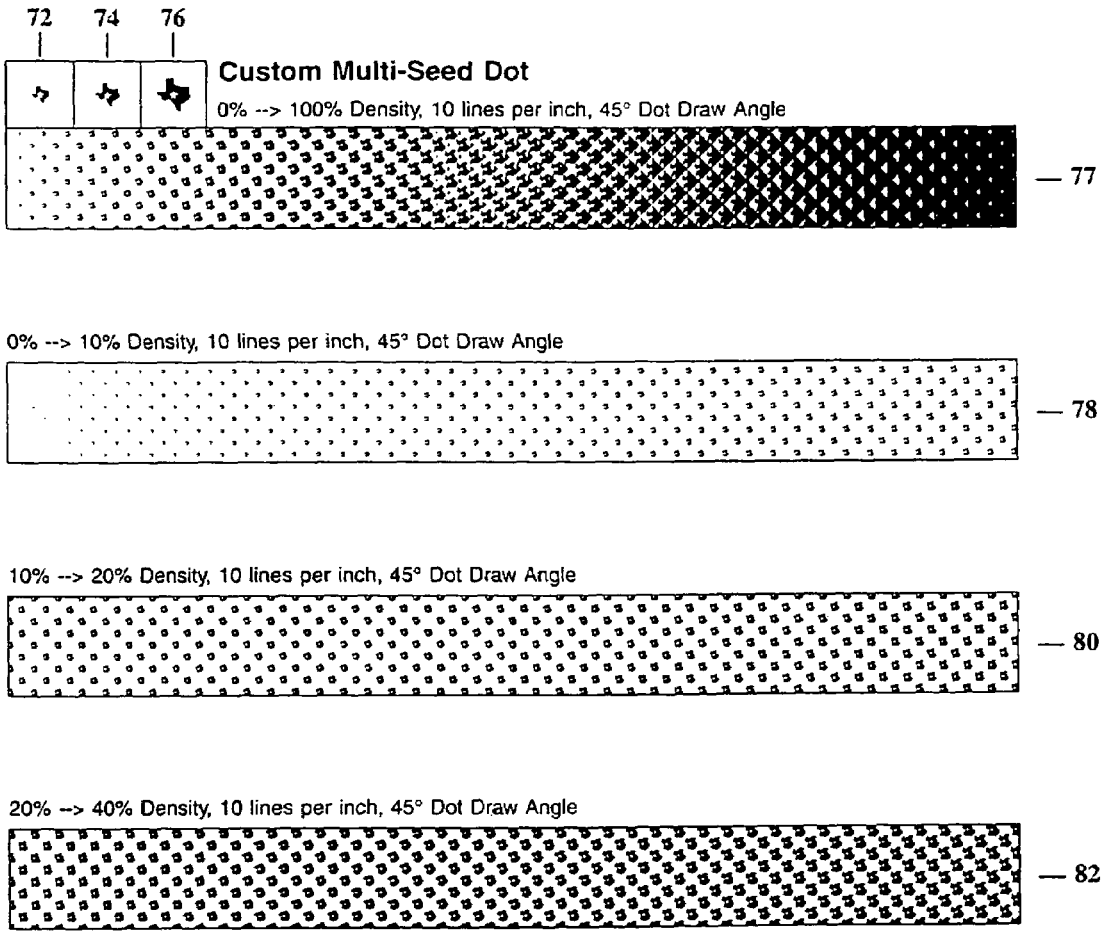
FIG. 9 shows examples of a multi-seed custom halftone dot.

Two small variations from this "circular fan-out distance ranking" are available to the user: use only the distance along the x axis from the growth center, or only the distance along the y axis from the growth center to establish ranking values. One other variation is that the user can load 2 or more "seed images," each corresponding to a particular density step between 0% and 100%, where the second and subsequent image(s) correspond(s) to an overall higher density than the first. The spot will therefore grow from 0% density to the first image, on to the combined image, on to the subsequent image(s), and finally to 100% density beyond the last image. An example of this variation is shown in FIG. 9 in which three images 72, 74, 76 are used. The image printing progression is shown at 77. Image 72 is printed 78 at densities of 0% to 10%. Image 74 is printed 80 at densities of 10% to 20% and Image 76 is printed 82 at densities of 20% to 40%. The current multiple image implementation requires each of the images to be bi-level: additional black pixels in the second and subsequent images are ranked by their adjacency to the pixels (already ranked) in the previous images, so that pixel ranking value coherence is maintained. The user can then save the pixel ranking values, along with other identifying and tracking information, to a named file.

The ranking methods described above are as implemented in the demonstration program DotMaker. These methods should in no way be construed as the only method for ranking pixels within a custom halftone cell. Other ranking methods may be employed to cause different white-to-black (including white-to-black-to-white-to-black and the inverse) progressions from the same "seed images," and they should be considered as part of the invention herein.

PostScript requires each pixel in the halftone dot to have a ranking value in the range −1 to +1. In the program of the preferred embodiment, Amgraf, Inc.'s PostScript file generation program, called "typdrv," was enhanced to output (for each custom dot) a PostScript array comprised of the dot's pixel ranking values, and an accompanying PostScript Spot Function which, when activated by the PostScript RIP, scales and maps the pixel ranking values to the range of −1 to +1 as required by the PostScript language.

Figure 10:
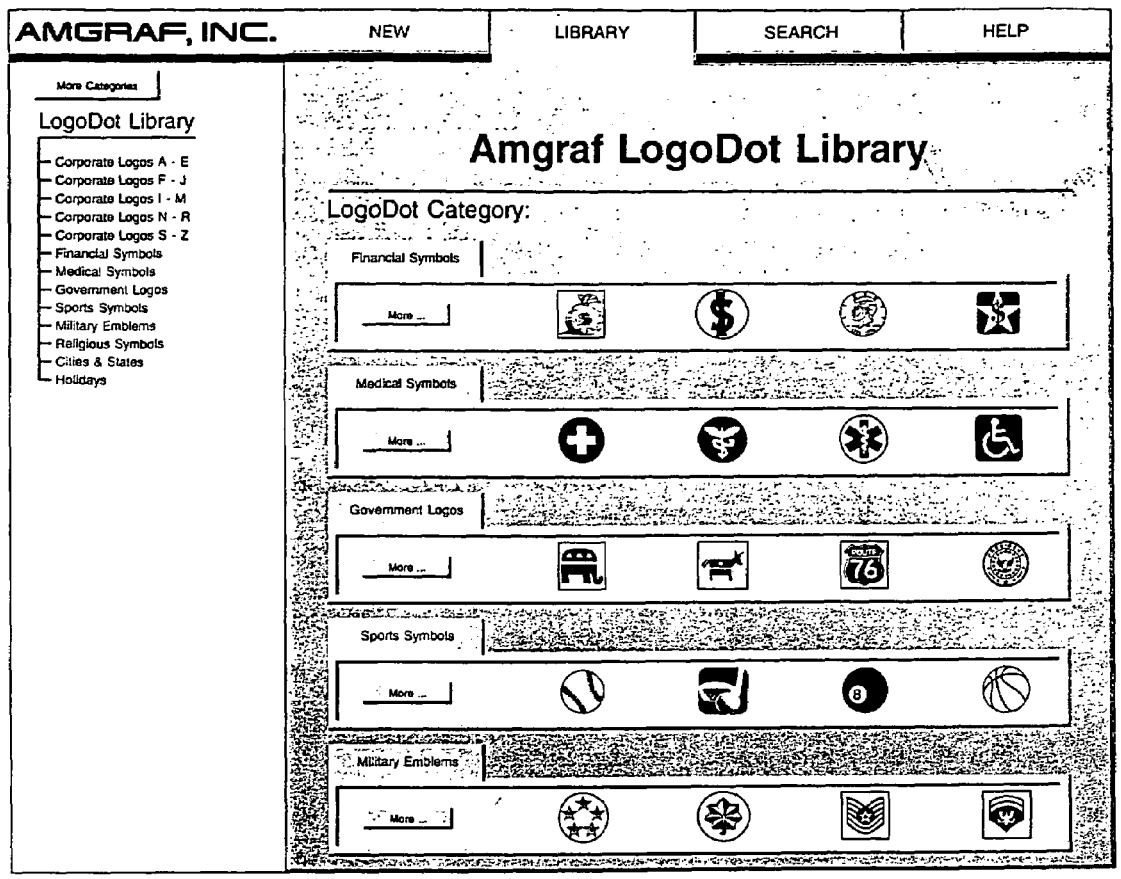
FIG. 10 shows a custom dot library user interface from one embodiment of the invention.

The preferred program also allows the user to save and refer to custom dots by name and assign screening attributes to any graphical element in a document layout. Custom dot designs are given a unique name and collected in a Custom Dot Library 84 shown in FIG. 10, which can be utilized by the MECCA 2000 Integrated Electronic Publishing Systems. A graphic designer using a MECCA 2000 system can assign any Custom dot name to any graphical element to be included in a target security document (except bar codes), thereby simplifying the inclusion of custom dots within a security document design.

Figure 11:
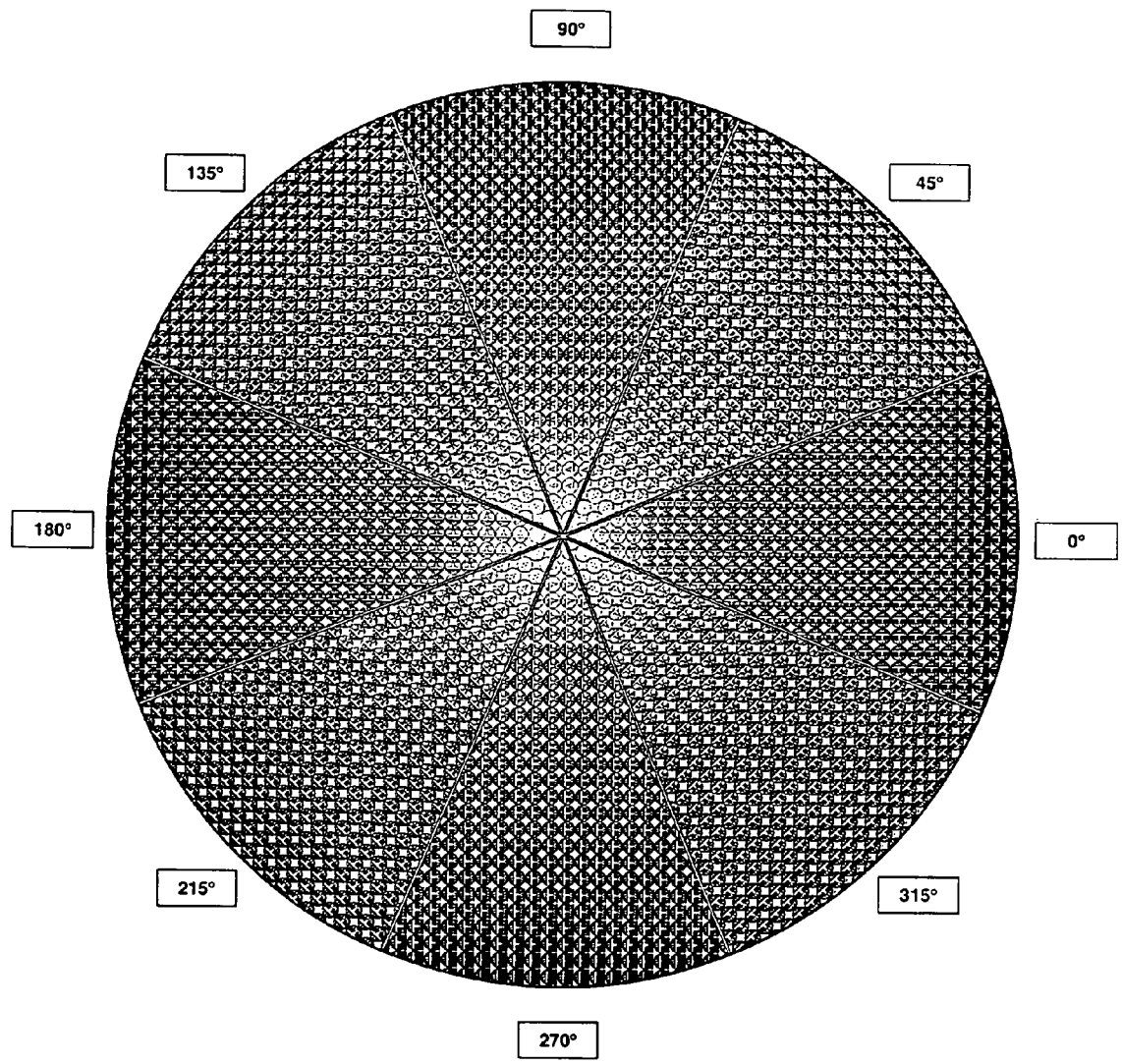
FIG. 11 shows an example of custom halftone dots at various screen angles.

When a user specifies the use of a Custom dot, the screening frequency and dot angle may also be specified, in exactly the same way and meaning as with conventional dots, to control dot size and rotation. To graphic art and printing industry professionals, specifying such a logodot is no different from using a conventional halftone dot. FIG. 11 illustrates the fact that logodots can be output at any arbitrary screen angle, the same as conventional halftone dots. The screen angle of foreground and background elements can be controlled when designing a security document.

Figure 12A:
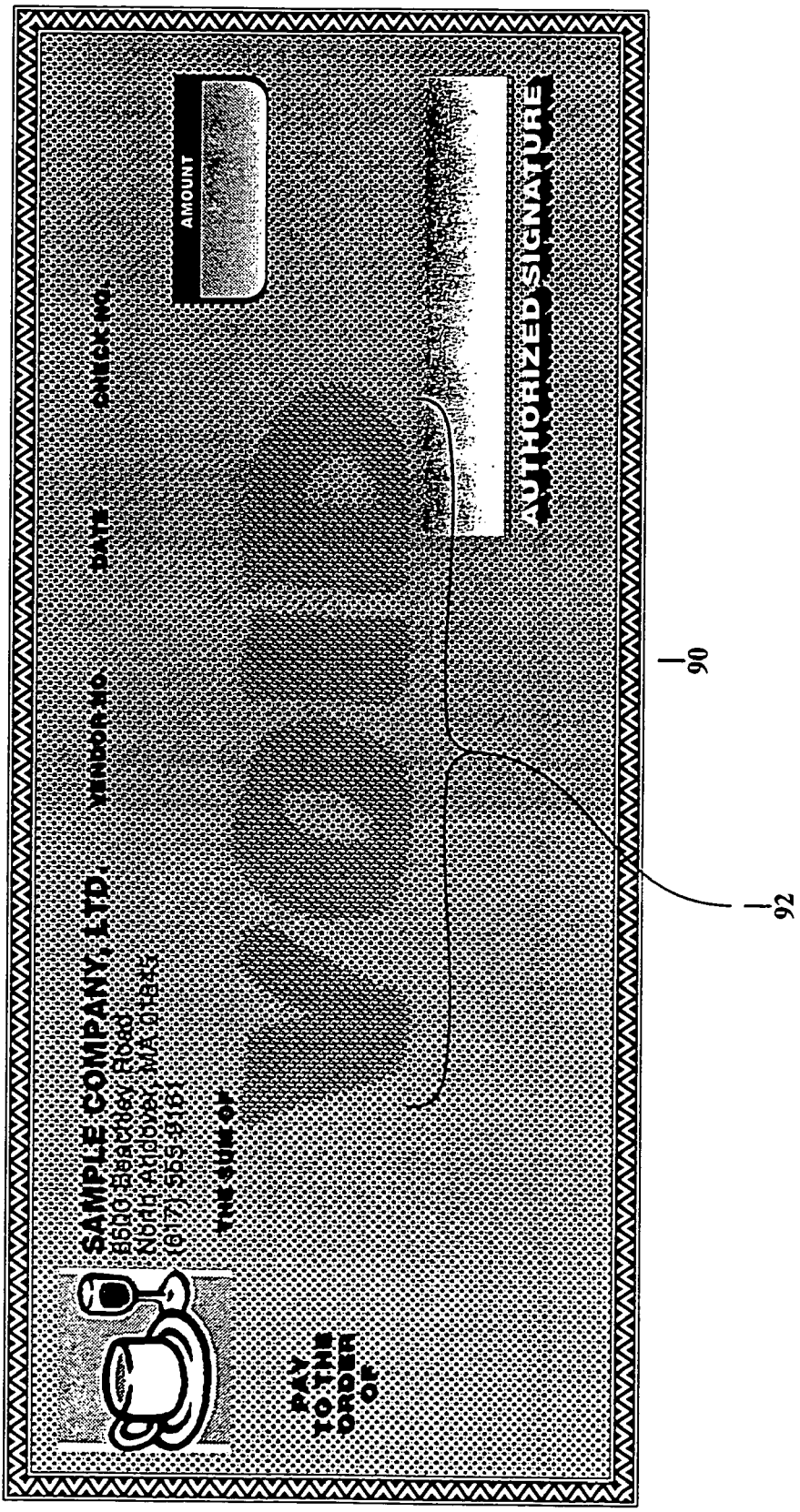
FIG. 12a shows a security document design with a combination of conventional halftone dots and custom halftone dots.
Figure 12B:
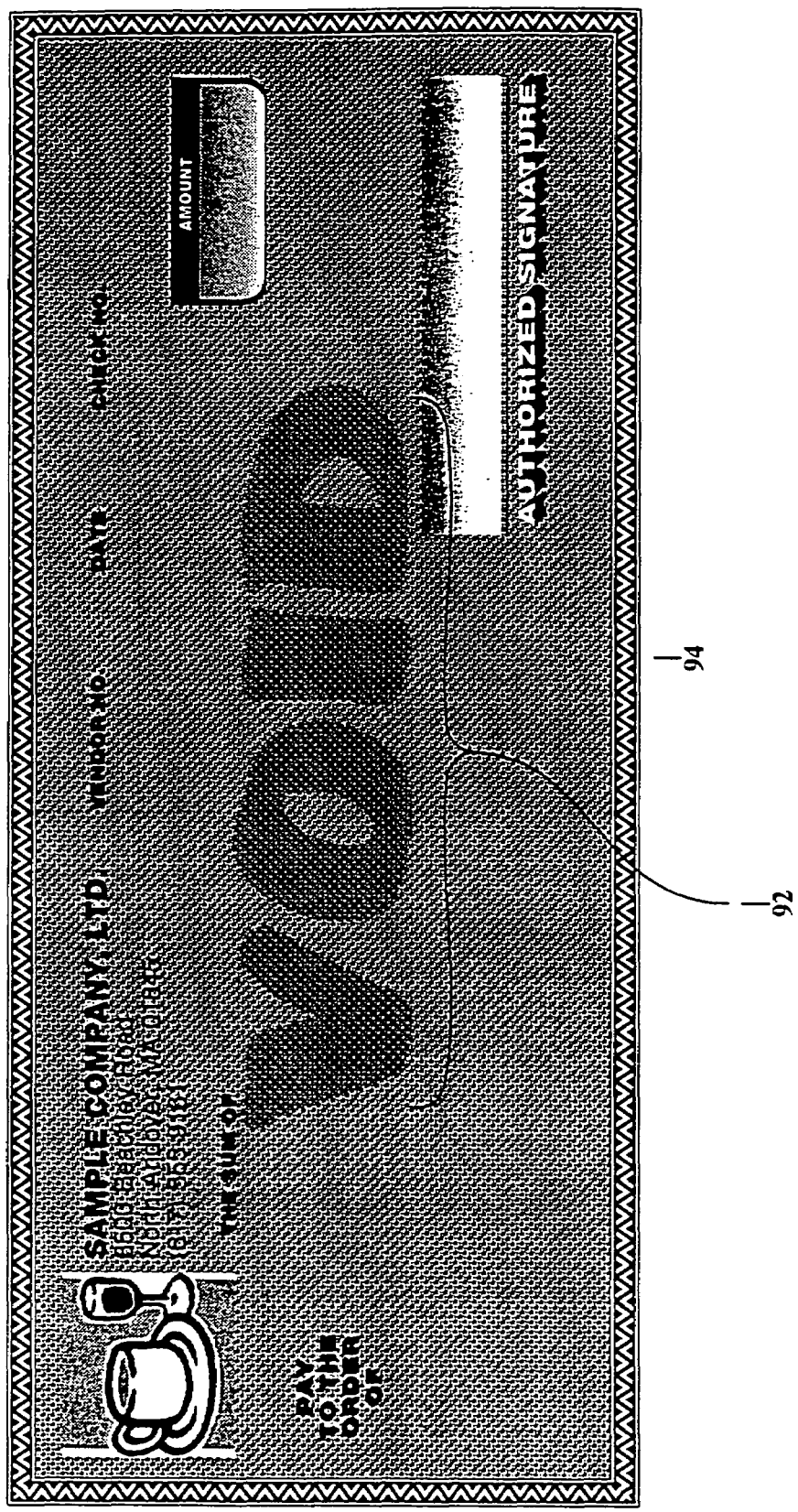
FIG. 12b shows a photocopy of FIG. 12a specimen.
Figure 13A:
FIGS. 13a–13d show custom halftone dots assigned to individual graphical elements that may be used within a composite image.
Figure 13A:
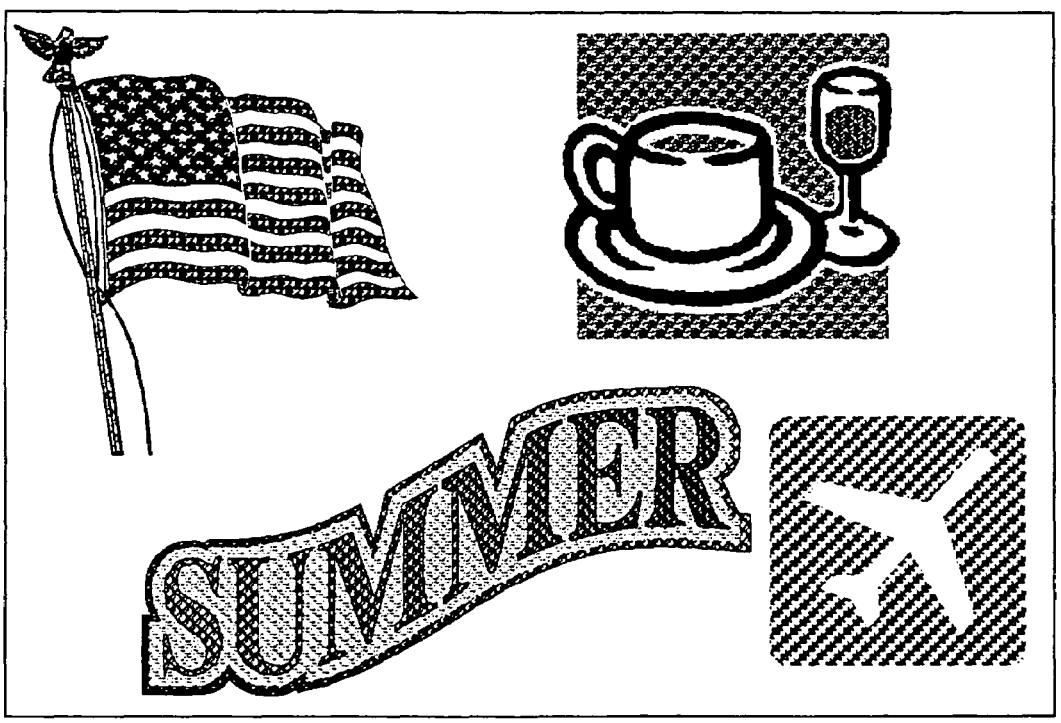
Figure 13B:
Figure 13B:
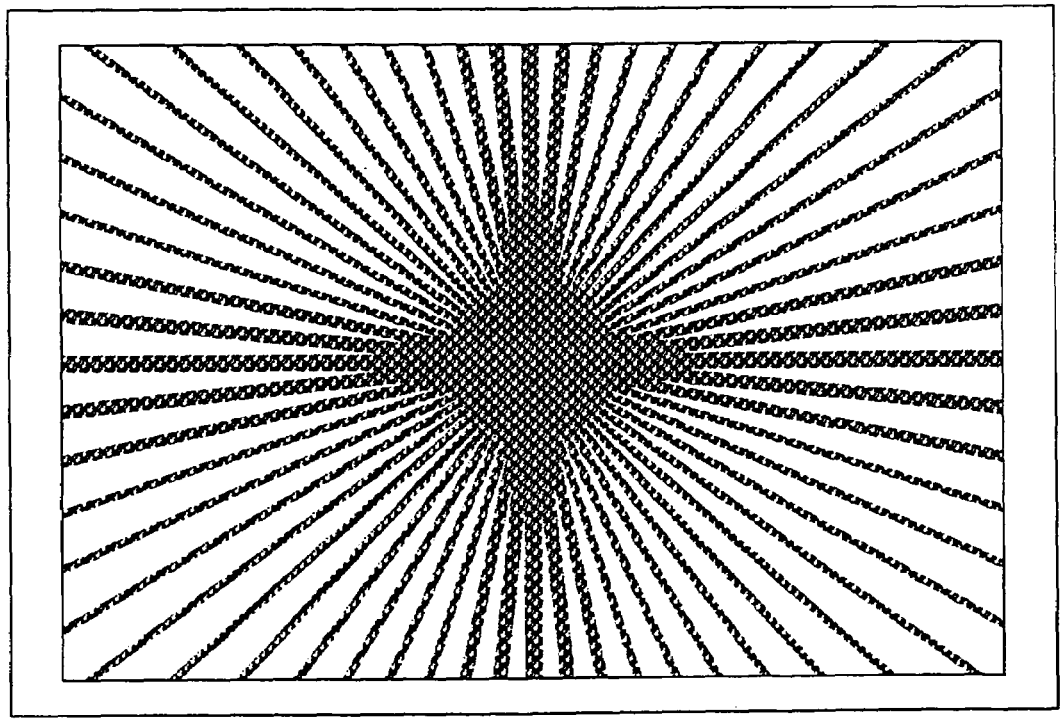
Figure 13C:
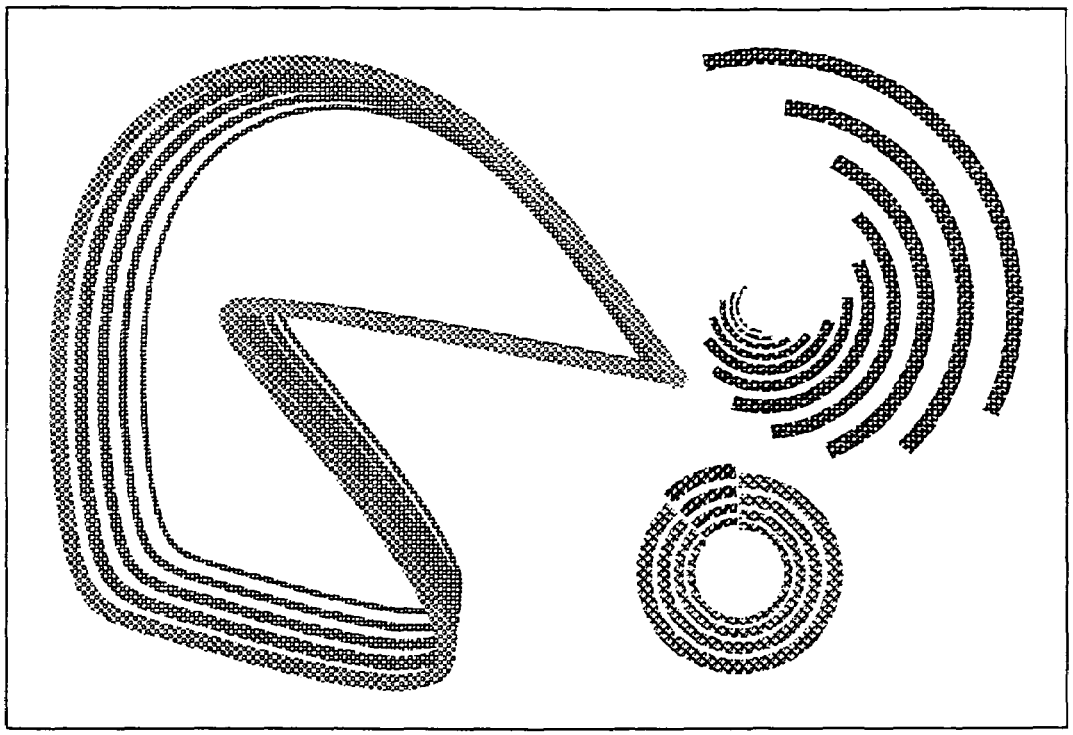
Figure 13C:
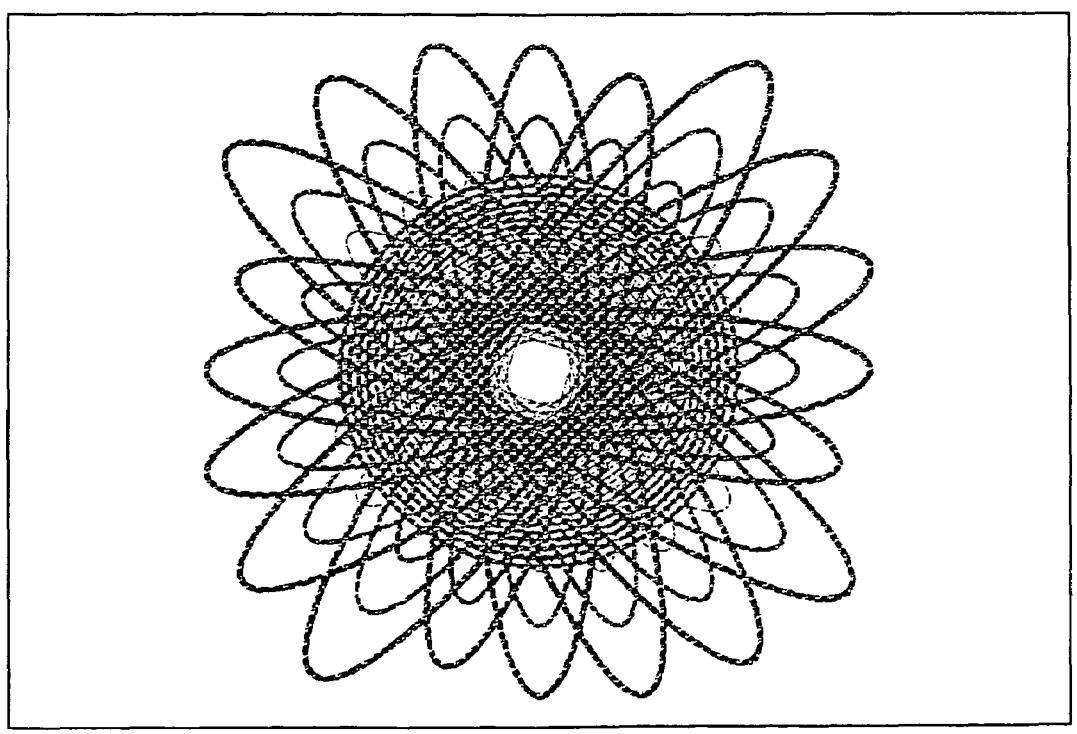
Figure 13D:
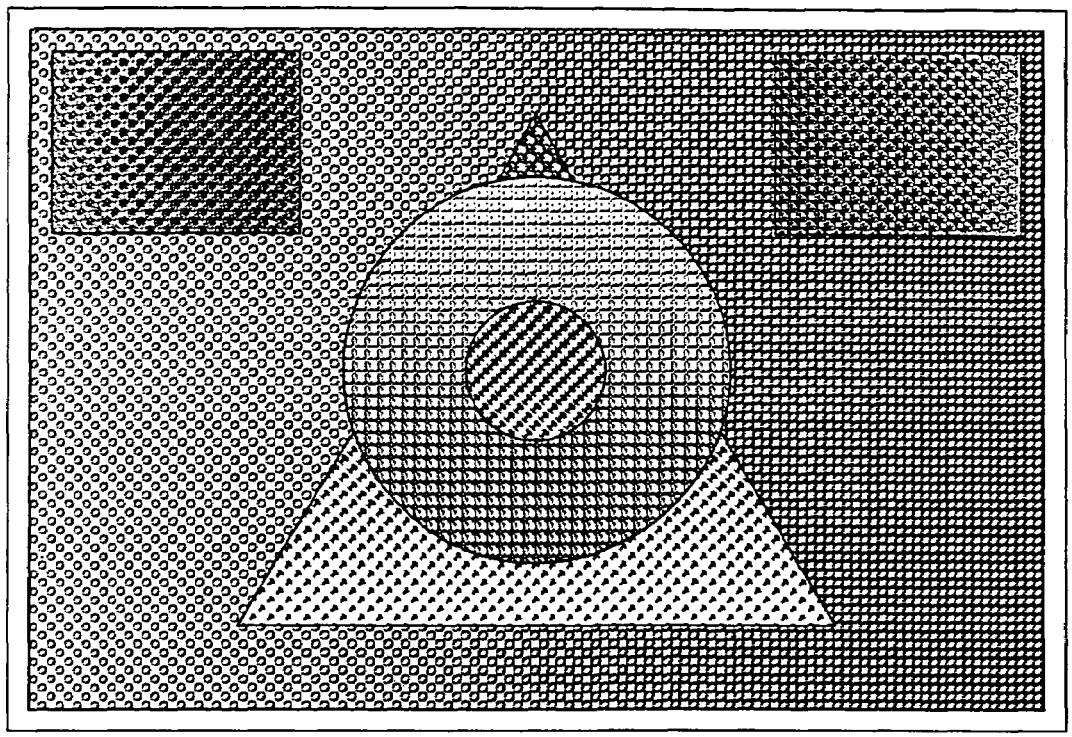
Figure 13D:
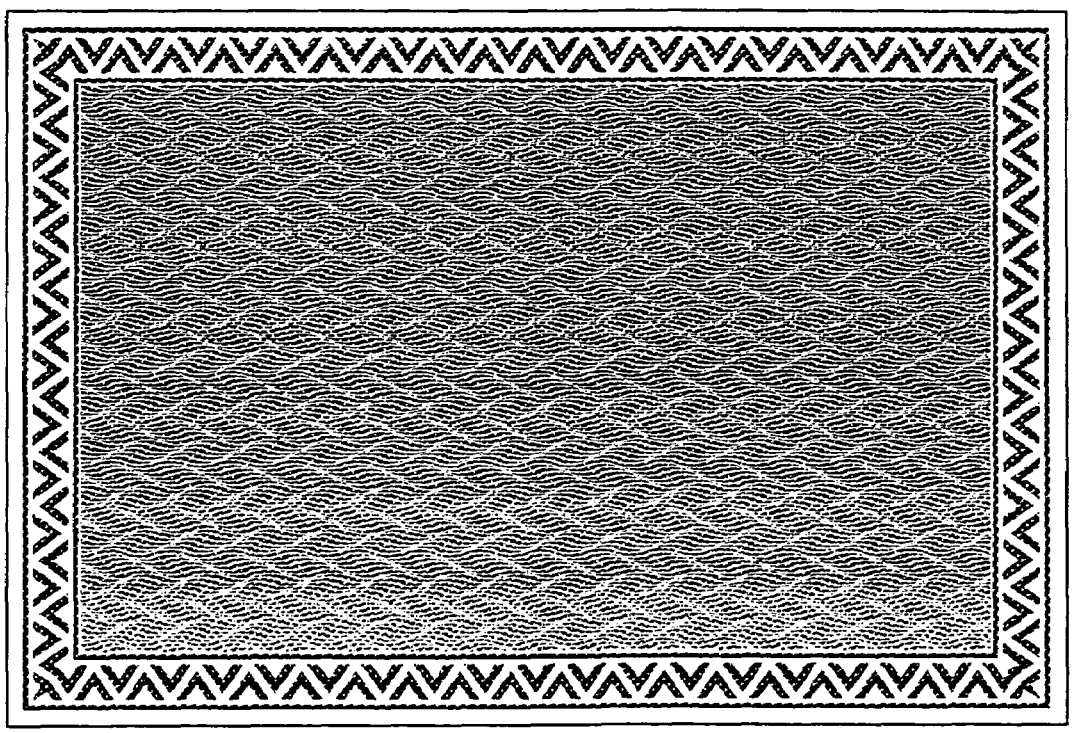
Figure 14:
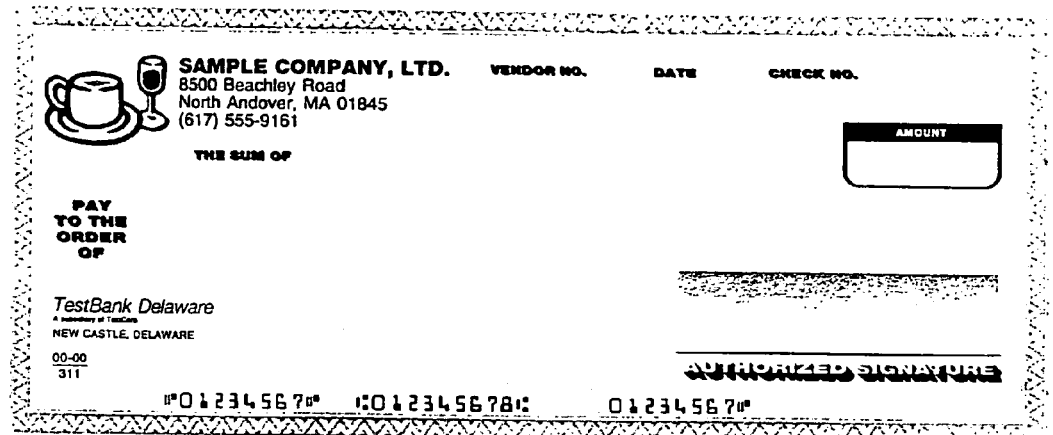
FIG. 14 shows a composite graphic image with a variety of conventional halftone dots and custom halftone dots.
Figure 14:
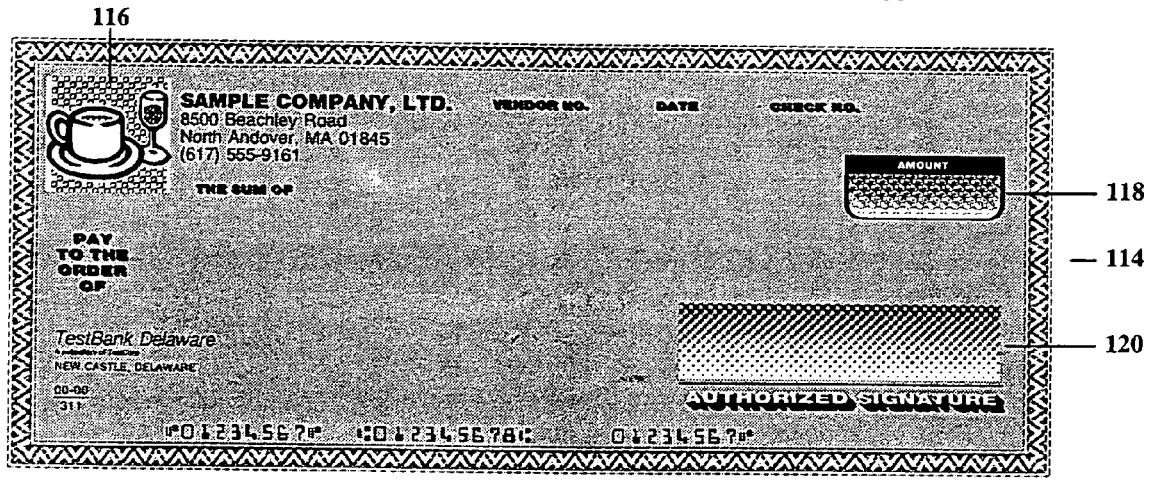

As shown in FIGS. 12a–12b, when compared to conventional halftone dots, logodots are much more difficult to faithfully copy using commercial photocopiers and scanners. FIG. 12a shows a sample security document 90 printed with standard halftone dots and regions of custom halftone dots 92. FIG. 12b represents a photocopy 94 of the security document 90 wherein the regions 92 comprising custom halftone dots spell out a self-cancelling message that becomes prominent in the photocopy. The primary reason the custom halftone dots photocopy differently is that the microscopic image embedded within the logodot is too small to be accurately resolved by all but the highest resolution scanning devices. More typically, the microscopic image completely distorts and only a "blot" results from the copying or scanning process.

Another reason that the logodots do not successfully reproduce via photocopier or scanner is due to the unique arrangement of the pixels that make up the microscopic image within the logodot. For a given tonal density (e.g. 40%), the same number of pixels within a logodot cell are illuminated (set to black) as for a conventional 40% halftone dot cell. Although the pixel count is the same, the fact that the pixels are arranged into a non-conventional microscopic image causes the logodot to have reflective and/or transmissive properties that are slightly different than the reflective and/or transmissive properties of conventional halftone (e.g. round) dots.

Another reason that contributes to the difficulty in photocopying and scanning of logodots is due to the implied overlay grid that occurs from digital copier and scanner devices. The grid effectively causes the scanner to sample small regularly-spaced rectangular areas of the printed document for their reflective and/or transmissive density values. Since the logodots are much more graphically complex than conventional halftone dots, there is an increased likelihood of significant variations in the density readings of a series of contiguous grid samples, resulting in pronounced streaking patterns in the resultant copy.

For the above stated reasons, when a security document design is made that consists of a combination of areas rendered with logodots adjacent to areas that are rendered with conventional halftone dots, these apparently slight differences become more prominent when a photocopy is made or the original document is scanned. This phenomenon provides an economical method for the commercial manufacture of printed security documents that are self-canceling when they are photocopied and/or scanned.

Thus, a mixture of logodots or custom and standard halftone dots can be used together within a composite image, and when their densities are set to similar gray levels, the human visual perception blends them together and gives the illusion of a uniform density spread. However, when sampled (seen) by a photocopier or scanner, the Custom dots "pop out" resulting in a lighter or darker gray (or color) value being rendered. This provides a cost-effective way to "embed" hidden warnings, phrases, images, logos or other graphical elements to self-cancel the counterfeit copy.

Through this invention, as shown in FIGS. 13a–13d, all or selected areas of a printed image can be rendered in logodots containing microscopic images that can be verified with a magnifying device, including photographs 96 (FIG. 13a), raster images, logos, and symbols 98 (FIG. 13a), text and typefaces 100 (FIG. 13b), rules and lines 102 (FIG. 13b), circles and ellipses 104 (FIG. 13c), arcs and splines 106 (FIG. 13c), colored areas 108 (FIG. 13d), borders, pantographs, and patterns 110 (FIG. 13d), and any other graphical element found or used in a commercially designed security document. These elements do not need to be converted to raster images in order to apply custom dot screening on them. In addition, any conventional halftone dot or logodot can be assigned to any graphical element, so that a given document can have a blend of many conventional and/or logodots. As shown in FIG. 7, a graphic designer is able to use his skill to select the best utilization of logodots depending on the requirements of the project. Security document 112 contains no logodots. Security document 114 contains three regions 116, 118, 120 comprised of logodots. Furthermore, once a graphical element within a composite image is assigned a logodot, it can be printed at any size, for any fixed density or a range of densities, at any desired screen angle, at many coarse-to-fine line frequencies, without re-computation as required by other techniques.

Although not all user-selected images can be used to construct a halftone dot that performs well throughout the full density range, there usually is a limited range where the custom dot is acceptable. The invented methods provide the capability for well-chosen bitmaps containing finely detailed pixel formations to be printed with high resolution devices so that photocopying or optical scanning machines would not be able to resolve the microscopic details. The loss of fidelity that occurs during the copying (or scanning) process is one basis for the security benefit of the present invention.

A security document employing custom halftone dots can also combine other security features to enhance document security. Moreover, electronic readers have and are being developed to identify these additional security features in combination with custom halftone dots in order to provide an automated method of identifying and verifying secure documents. Thus, Appleton Security Products, in partnership with Spectra Systems, has recently developed the Pocket Eye™ hand held reader that can detect the combination of a substrate embedded with UV coded tagent with the presence of other data Such as custom halftone dots. The UV coded tagents trademarked TechMark™, are embedded into the substrate and are covertly coded so only the Pocket Eye™ can identify them. Unless the reader identifies the presence of the TechMark™ code, the data carrier cannot be opened. In conjunction with custom halftone dots, or other features, the TechMark™ acts as a key in a lock and key system. This combination creates a strong document security system. This system can be used in many applications including, among others, verification of tickets.

With respect to the above description then, it is to be realized that the optimum relationships for the parts of the invention to include variations in software, systems, materials, shape, form, function and manner of operation, assembly and use, are deemed readily apparent and obvious to one skilled in the art, and all equivalent relationships to those illustrated in the drawings and described in the specification are intended to be encompassed by the present invention. It is understood that the practical DPI resolution of imaging, scanning, copying, and printing devices will continue to increase in the future, resulting in higher screen frequencies for both conventional halftone dots and logodots.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Although it has been demonstrated primarily with respect to check printing, the invented method also has applicability in the manufacture of secure labels, decals, tags, identification cards, packages, tickets and other printed products. In addition, the invented method has value for artistic design beyond the utility of security document protection. The ability to include one's corporate logo or self-portrait as a microscopic image within a printed document or object has the appeal of added personalization or validation. The ability to name and recall the logodots is the foundation for building libraries of custom dot designs for various commercial, industrial, and artistic purposes.

The invention claimed is:

1. A method of printing a substrate having security features comprising the steps of:
   importing a digitized design comprising a plurality of pixels;
   assigning pixel illumination ranking values corresponding to the plurality of pixels using a spot algorithm to create a first spot cell for a custom halftone dot; and
   printing a substrate having at least one region comprising the custom halftone dot.

2. The method of claim 1 wherein the step of assigning pixel illumination ranking values comprises setting values corresponding to imported grey-scale pixel values of the digitized design.

3. The method of claim 2 wherein darker grey-scale pixel values are assigned higher pixel illumination ranking values.

4. The method of claim 1 wherein the step of assigning pixel illumination ranking values comprises converting imported color pixel values to grey-scale pixel values and setting values corresponding to grey-scale pixel values of the digitized design.

5. The method of claim 4 wherein darker grey-scale pixel values are assigned higher pixel illumination ranking values.

6. The method of claim 1 wherein the step of assigning pixel illumination ranking values comprises selecting at least one growth center of the digitized design and assigning illumination ranking to imported dark bi-level pixels based on the distance from the dark pixels to the at least one growth center.

7. The method of claim 1 wherein the step of assigning pixel illumination ranking values comprises selecting a growth center of the digitized design and assigning illumination ranking to imported dark bi-level pixels based on the distance along a single axis from the dark pixels to the growth center.

8. The method of claim 1 further comprising the step of scaling the pixel illumination ranking values for use in a printer language.

9. The method of claim 1 further comprising the step of saving the spot cell for later use.

10. The method of claim 7 Further comprising the step of assigning the spot cell to a graphical element selected from the group comprising photographs, raster images, logos, symbols, text, type faces, rules, lines, circles, arcs, splines, colored areas, borders, pantographs, or patterns.

11. The method of claim 1 further comprising the steps of:
providing a second digitized design comprising a plurality of pixels;
assigning pixel illumination ranking values corresponding to the second plurality of pixels to create a second spot cell for a second custom halftone dot; and
assigning the first spot cell to be printed in a first printing density range, the first and second spot cells to be printed in a second printing density range, and the second spot cell to be printed in a third density range.

12. The method of claim 1, wherein the pixel illumination ranking values are assigned utilizing-white to gray to black transitions of the pixels, and the locations of the pixels within the digitized design.

13. A computer programmed to create a substrate having security features comprising:
means for importing an image comprising a plurality of pixels;
means for assigning pixel illumination ranking values corresponding to the plurality of pixels using a spot algorithm to create a spot cell for a custom halftone dot; and
means for selecting a region on the substrate to comprise the halftone dot.

14. The programmed computer of claim 13 further comprising means for saving the custom halftone dot in a library for future use.

15. A computer-readable medium encoded with a computer program for printing a halftone dot on a substrate, the computer program comprising:
a code segment operable to be executed by a computing element to import a digitized design comprising a plurality of pixels;
a code segment operable to be executed by the computing element to assign pixel illumination ranking values corresponding to the plurality of pixels using a spot algorithm to create a spot cell for a custom halftone dot; and
a code segment operable to be executed by the computing element to print a substrate having at least one region comprising the custom halftone dot.

16. The computer-readable medium of claim 15, wherein the code segment assigns pixel illumination ranking values by selecting at least one growth center of the digitized design and assigning illumination ranking to imported dark bi-level pixels based on the distance from the dark pixels to the at least one growth center.

17. The computer-readable medium program of claim 15, wherein the code segment assigns pixel illumination ranking values by selecting a growth center of the digitized design and assigning illumination ranking to imported dark bi-level pixels based on the distance along a single axis from the dark pixels to the growth center.

18. The computer-readable medium program of claim 15, further comprising a code segment operable to scale the pixel illumination ranking values for use in a printer language.

19. The computer-readable medium of claim 15, wherein the code segment assigns pixel illumination ranking values utilizing-white to gray to black transitions of the pixels, and the locations of the pixels within the digitized design.

* * * * *